H. A. BENSON.
WEIGHING MACHINE.
APPLICATION FILED JULY 7, 1909.

973,909.

Patented Oct. 25, 1910.
4 SHEETS—SHEET 2.

Witnesses
Geo. H. Byrne.
Jas. E. Dodge.

Inventor
Henry A. Benson.
By Wilkinson, Fisher & Witherspoon
Attorneys

H. A. BENSON.
WEIGHING MACHINE.
APPLICATION FILED JULY 7, 1909.
973,909.
Patented Oct. 25, 1910.
4 SHEETS—SHEET 3.
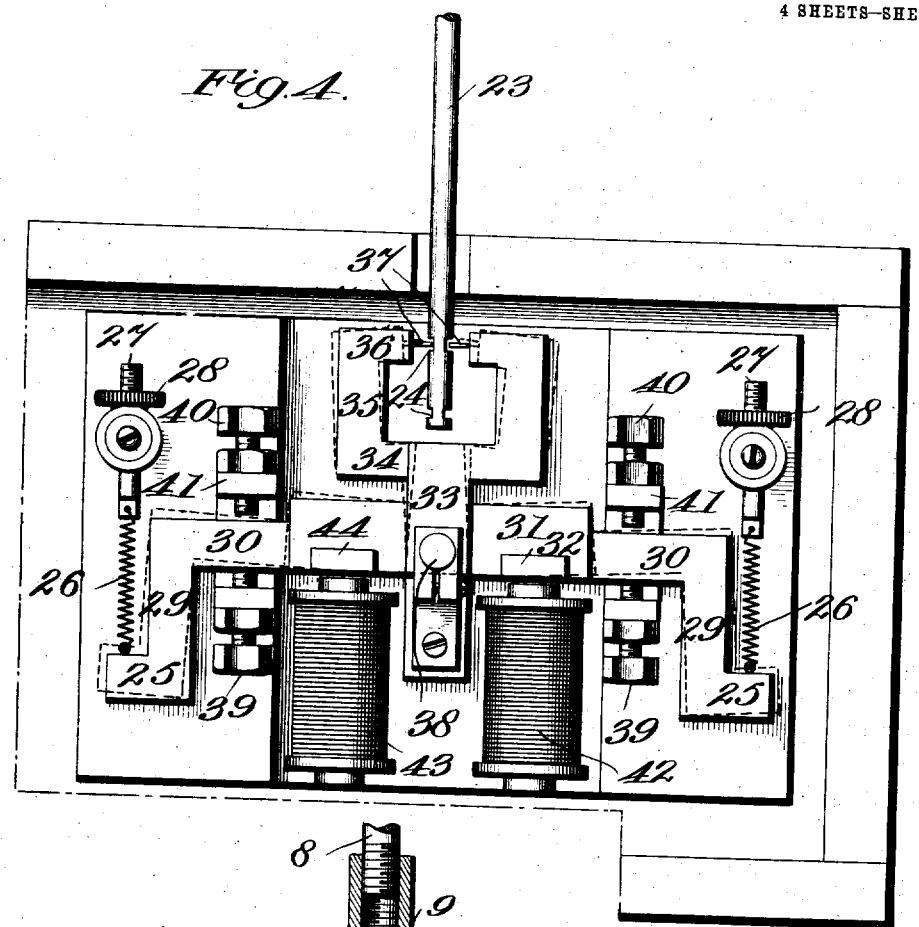
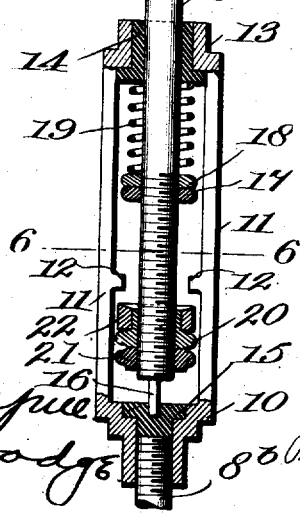
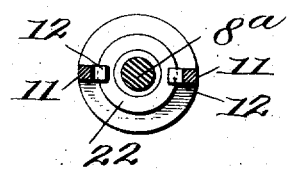
Witnesses
Geo. A. Bruce
Jas. E. Dodge
Inventor
Henry A. Benson,
By Wilkinson, Fisher & Witherspoon
Attorneys.

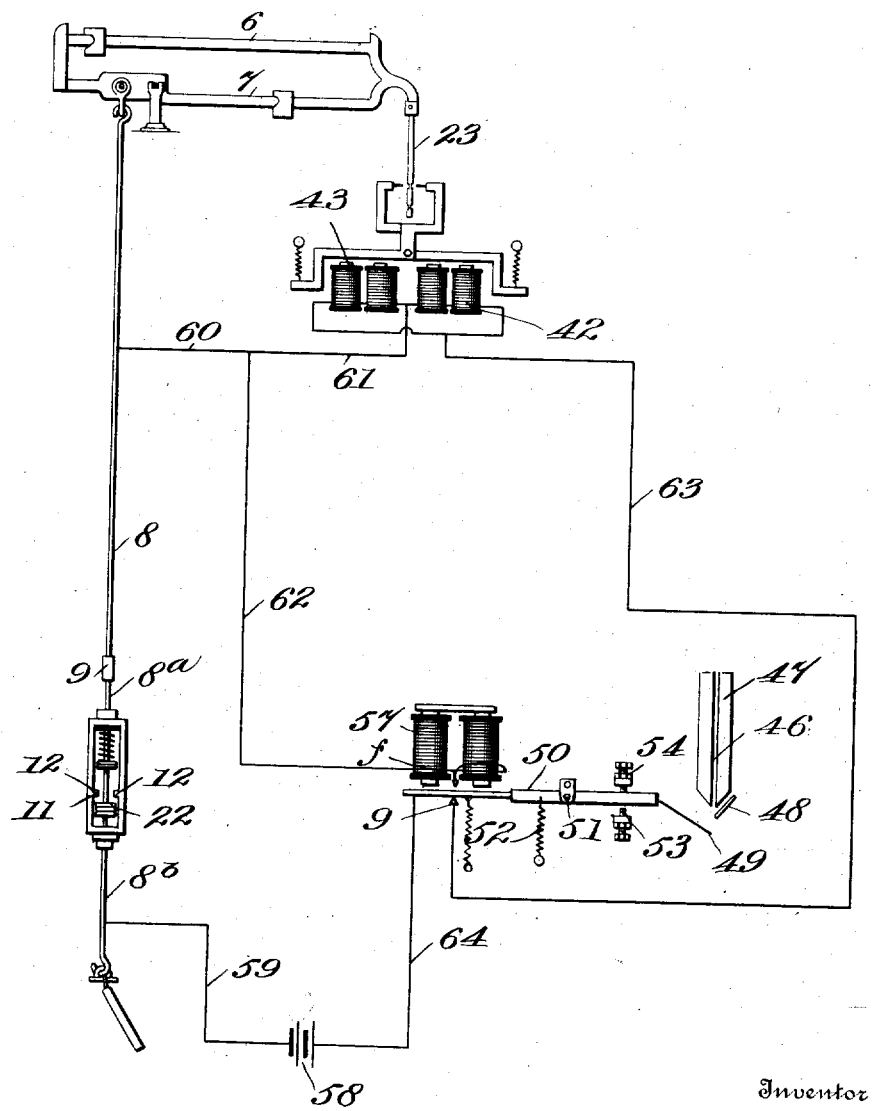

UNITED STATES PATENT OFFICE.

HENRY A. BENSON, OF SCRANTON, PENNSYLVANIA.

WEIGHING-MACHINE.

973,909.

Specification of Letters Patent.

Patented Oct. 25, 1910.

Application filed July 7, 1909. Serial No. 506,420.

*To all whom it may concern:*

Be it known that I, HENRY A. BENSON, a citizen of the United States, residing at Scranton, in the county of Lackawanna and State of Pennsylvania, have invented certain new and useful Improvements in Weighing-Machines; and I do hereby declare the following to be a full, clear, and exact description of the invention, such as will enable others skilled in the art to which it appertains to make and use the same.

My invention relates to improvements in weighing machines which may be used either as ordinary weighing machines or as coin controlled weighing machines, and the object of my invention is to produce a device which may be used like an ordinary pair of scales up to a certain limit, but in case it is attempted to weigh an object heavier than a predetermined amount, the scales will be automatically locked until unlocked by dropping a coin into a slot.

With this object in view, my invention consists in the construction and combinations of parts as hereinafter described and claimed.

Figure 1:
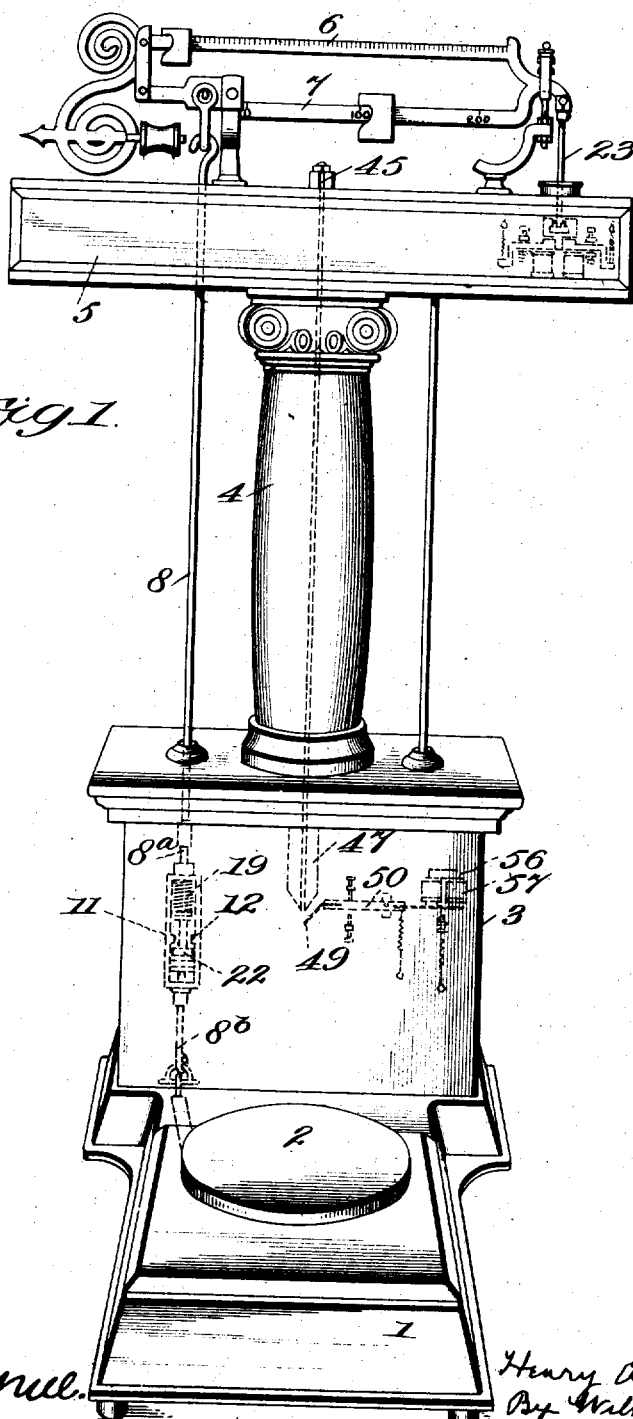
Figure 2:
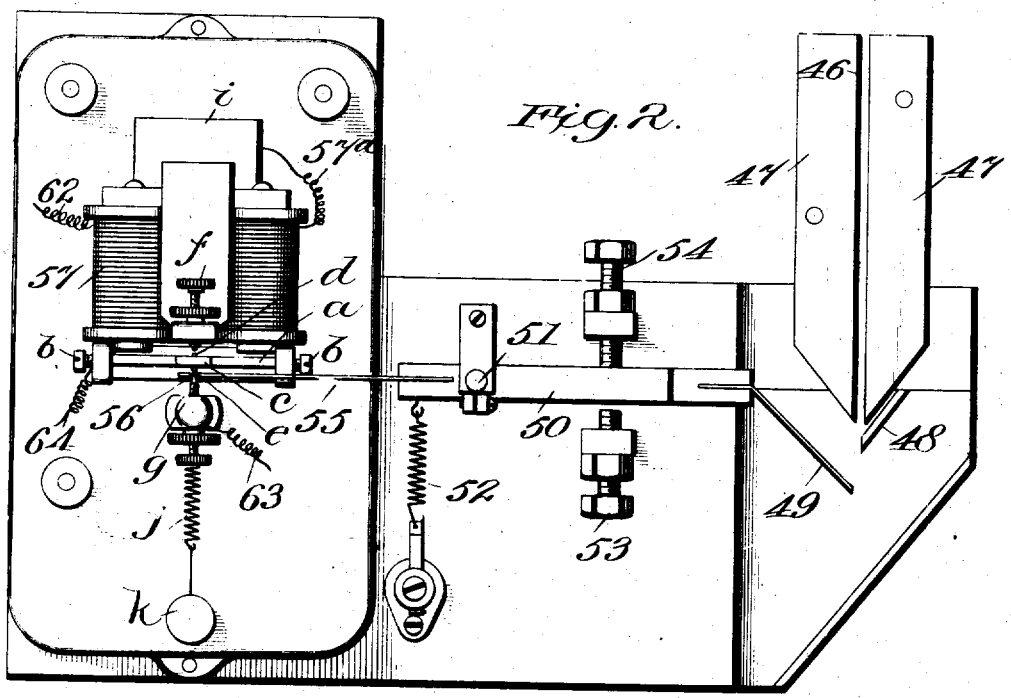
Figure 3:
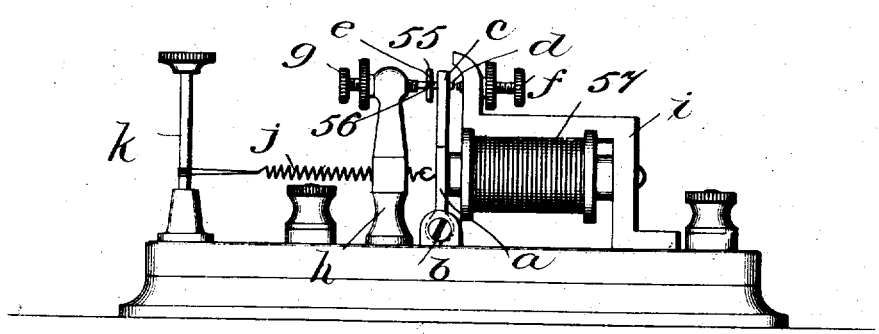

In the accompanying drawings—Figure 1 is a front view of my improved weighing machine, some of the interior parts being shown in dotted lines. Fig. 2 is a side elevation showing the electrical means operated by the dropping of a coin. Fig. 3 is a side elevation of the magnet and coöperating parts shown in Fig. 2. Fig. 4 is a side elevation of the parts for locking the scale beam when a weight greater than a predetermined amount is placed on the platform. Fig. 5 is a cross section of a part of the connection between the platform and the scale beam. Fig. 6 is a cross section taken on the line 6—6 of Fig. 5, and Fig. 7 is a diagrammatic view illustrating the electric circuits.

In the accompanying drawings, Fig. 1 represents an ordinary platform scale with my invention applied thereto. The base 1, movable platform 2, case 3, pillar 4, top support 5, and scale beams 6 and 7 are all of the ordinary type. I wish to say, however, that while I have shown my invention as applied to a platform scale, it is not limited to this form, as it might be applied to any scale.

8 represents a rod connecting the scale beam with the usual system of levers, connecting with the movable platform 2. These connections and this rod are of the usual construction, except the part shown in Fig. 5. As shown in this figure, the rod 8 is not a continuous rod, but is composed of three pieces, 8, 8ª, and 8ᵇ, the parts 8 and 8ª being united together by a screw-threaded sleeve 9, whereby the length of the connecting rod may be adjusted as desired. Connected to the part 8ᵇ by a screw-threaded connection, is a head 10, provided with two upwardly projecting arms 11, each having an inwardly projecting portion 12. The upright arms 11 connect with a similar upper head 13. Between the head 13 and the part 8ª, is an insulating washer 14, having its lower part expanded, and similarly the interior of the head 10 is provided with a T-shaped insulating washer 15. The lower end of the section 8ª of the rod is provided with a guide pin 16, adapted to move in a perforation in the top of the insulating plug 15. The parts 14 and 15 are preferably made of hard rubber, although any suitable insulating material may be employed.

The lower part of the section 8ª is screw-threaded, and on the upper part of this screw-threaded portion are mounted nuts 17 and 18, the nut 17 being merely a lock nut, and a spring 19 surrounds the part 8ª, bearing against the nut 18 and the lower end of the plug 14. On the lower end of the part 8ª is a nut 20, below which is a lock nut 21. On the nut 20 is mounted a contact washer 22, having a sharp upper edge and adapted, when the spring 19 is sufficiently compressed, to strike against the projections 12 on the arms 11, thereby completing an electrical circuit, as hereinafter described.

The tension of the spring 19 is so arranged that if a weight up to a predetermined limit, say 50 lbs., is placed upon the platform 2, the connecting rods 8, 8ª, and 8ᵇ will move as one piece, the spring 19 being strong enough to keep these three parts in the relative position shown in Fig. 5, but in case a greater weight is placed on the platform 2, the spring 19 will be compressed, whereupon the projections 12 will strike the part 22, completing an electric circuit, as hereinafter pointed out. On completion of this electric circuit, the scale beams 6 and 7 are immediately locked and held locked until released by the insertion of a coin into the machine, and this is done in the following manner:

To the end of the scale beam is pivotally attached a downwardly projecting rod 23, which passes through a perforation in the top of the part 5. This rod is provided with a series of reduced portions 24 near its lower end. Within the top support 5 is located means for locking said rod 23 against movement, shown in dotted lines in Fig. 1 and also shown on an enlarged scale in Fig. 4. This device consists of two bent levers with various offsets and shoulders. These levers are similar in shape but oppositely arranged, and each consists of a horizontal end portion 25 to which is attached a spring 26, adjustably supported on a screw-threaded rod 27, provided with a thumb nut 28. The lever is then provided with a vertical part 29, a horizontal part 30, a thickened horizontal part 31, in which is carried a steel armature 32 for the corresponding magnet, a vertical portion 33, a horizontal portion 34, a vertical portion 35, and a horizontal portion 36, carrying a pin 37, the whole being pivoted on a pin 38. These levers cross each other, being offset so as to move freely on the pin 38, and the springs always tend to keep the levers in the position shown in the dotted lines, that is, disengaged from the rod 23. The limit of motion of each of these levers is governed by set screws 39 and 40, adjustably secured in a bent bracket 41. 42 and 43 represent ordinary electro-magnets adapted to attract, when energized, the corresponding armatures 32 and 44.

The arm 23 is locked until released by the passage of a coin. This coin is dropped into a slot 45 and falls down through the pillar 4 in a slot 46 between guides 47, see Fig. 2. As the coin leaves the lower end of the slot 46, it strikes against an inclined partition 48 and is deflected so that it strikes a bent arm 49, carried on the end of a vibrating lever 50. The lever 50 is pivoted on a pin 51, and a spring 52 ordinarily holds the lever in the position shown in Fig. 2 until the part 49 is struck by the falling coin. Adjustable set screws 53 and 54 limit the movement of the lever 50 in either direction. The lever 50, which may be of wood or other insulating material, is provided with a flat arm or plate 55, extending from its inner end, and may be provided with an aperture 56 hereinafter referred to. Operating in conjunction with this arm 55, as shown most clearly in Figs. 2 and 3, I provide mechanism operating upon the deposit of a coin to shunt the current from the main circuit to release the scale beams by permitting the locking levers to assume their unlocked positions. This mechanism consists of an electro-magnet 57 provided with an armature $a$ pivotally secured to a base support as at $b$, so that the same may oscillate freely. The armature $a$ is provided with an extending arm $c$, which extending arm on opposite faces has contact points $d$ and $e$, the contact point $d$ coöperating with an adjustable contact screw $f$ and the contact point $e$, coöperating with an adjustable contact screw $g$, the contact screw $g$ being supported by the standard $h$ and the contact screw $f$ being supported by the bracket $i$. $j$ designates a spring connected with one end of the armature and switch arm $a$, and at the other end connected to the adjusting screw $k$, so that the armature $a$ is normally drawn away from the electro-magnet 57, with the contact point $e$ in engagement with the contact screw $g$, the contact point $e$ projecting through the opening 56 in the flat plate 55.

Referring to the diagrammatic view in Fig. 7 and also Fig. 2, 58 represents an electric battery of any desired type, connected by a wire 59 with the part $8^b$ of the connecting rod. To the upper end of this rod is also connected a branched wire 60, one branch 61 running to the magnets 42 and 43 of the locking device, and the other branch 62 running to one end of the coil of magnet 57 of the shunting device, the other end of the coil being connected by a wire $57^a$ (Fig. 2) to the bracket $i$, carrying the contact screw $f$. 63 designates a wire running from the coils of the electro-magnets 42 and connected to the contact screw $g$, through the standard $h$. 64 designates a wire forming a connection between the contact arm $c$ of the armature $a$ and the battery.

In operation it will be seen that the machine may be placed in a store, for example, and the machine may be used by the storekeeper for ordinary weighing purposes up to a certain predetermined limit for which the spring 19 is set, for instance 50 lbs. Under such conditions, the locking apparatus will not be brought into action, within that limit, and the scale will act exactly like an ordinary scale. If, however, a weight greater than the predetermined amount be placed on the platform 2, the spring 19 is compressed and the part 22 contacts with the projections 12, completing an electric circuit, which runs from the battery 58 through the wire 59, the connecting rod 8, the wire 60, around coils of the magnets 42 and 43, thence through the wire 63, the contact post $h$, the contact screw $g$, the armature and switch $a$, and finally through the wire 64 to the battery 58. As the current passes around the coils of the electro-magnets 42 and 43, they are energized, whereupon the locking levers are moved into engagement with the rod 23. This holds the scale beam locked against displacement, but when a coin is dropped into the slot 45 and falls down through the slot 46, it is deposited on the part 49, throwing the lever downwardly from the position shown in Fig. 2 against the tension of the spring 52. As the lever 50 is moved downwardly, the plate 55 is moved upwardly, and engaging the contact arm c of the armature, the contact point e passing through the opening 56, the contact arm c is moved toward the electro-magnet and the contact point e, leaving the contact screw g, the circuit in the main line is broken, while the contact point d engaging the contact screw f a circuit is immediately closed through the wire 59, the rod 8, the wire 60, the wire 62, the coils of the magnet 57, the wire 57ª, the bracket i, the contact screw f, the armature and wire 64. Upon the main circuit being opened the locking levers assume their normal position and the scale beam is free to move, the second circuit being maintained closed by the energized magnet 57. After the weight has been moved from the scale platform, the parts 12 and 22 are moved out of contact with each other, and the auxiliary circuit is thereby opened and the parts again assume their normal position with the contact point e in engagement with the contact screw g.

I claim:

1. In a weighing machine, the combination of a platform, a scale beam, electric means whereby said scale beam is prevented from operating when a weight greater than a predetermined amount is placed on the platform, said means including a two-part adjustable connection between said platform and the scale beam, substantially as described.

2. In a weighing machine, the combination of a platform, a scale beam, and electrically operated means whereby said scale beam is prevented from movement when a weight greater than a predetermined amount is placed on the platform, said means including a two-part connection between said platform and the scale beam, the parts thereof being provided with suitable insulating material, with a spring for regulating the relative movement between said parts, and means for adjusting said spring, substantially as described.

3. In a weighing machine, the combination of a platform, a scale beam, and means whereby said scale beam is automatically locked when a weight greater than a predetermined amount is placed on the platform, said means including a rod carried by said scale beam, and electric means for automatically locking said rod against movement substantially as described.

4. In a weighing machine, the combination of a platform, a scale beam, and means whereby said scale beam is prevented from moving when a weight greater than a predetermined amount is placed on the platform, said means including a rod attached to said scale beam, electrically operated gripping means for holding said rod against movement, and an extensible connection between said platform and said scale beam, whereby an electric circuit is closed when said connection is extended to a predetermined amount, substantially as described.

5. In a weighing machine, the combination of a platform, a scale beam, and means whereby said scale beam is prevented from moving when a weight greater than a predetermined amount is placed on the platform, said means including a rod attached to said scale beam, electrically operated means for gripping said rod and preventing its movement, and a two-part adjustable, spring-controlled connection, between said platform and said scale beam, whereby when the spring in said connection is compressed to a predetermined amount, an electric circuit is closed and the rod attached to the scale beam locked, substantially as described.

In testimony whereof, I affix my signature, in presence of two witnesses.

HENRY A. BENSON.

Witnesses:
MARY B. GALLAGHER,
FREDERICK H. WIDMAYER.